P. J. McGuiness,
Bridle Bit,

N° 78,466.      Patented June 2, 1868

Witnesses:
Theo Tusche
J. A. Fraser

Inventor:
P. J. McGuiness
Per Munn & Co
Attorneys

United States Patent Office.

PATRICK J. McGUINESS, OF NEW YORK, N. Y.

Letters Patent No. 78,466, dated June 2, 1868.

---

IMPROVED BRIDLE-BIT.

---

*The Schedule referred to in these Letters Patent and making part of the same.*

---

TO ALL WHOM IT MAY CONCERN:

Be it known that I, PATRICK J. McGUINESS, of the city, county, and State of New York, have invented a new and improved Bridle-Bit; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new bridle-bit, which is so arranged that it may at pleasure be used as an ordinary or as a curb-bit.

The bit consists of two pieces, hinged or pivoted together in the middle, one end of each piece being connected with the reins, while the other end carries a stop, which is near to the end of the other bar, and which, when on the rear side of the bar, prevents the two bars from turning independently around their pivot, while, when the stop is in front of the other bar, the two bars will be turned when pulled by the reins, and will act as a curb-bit in the horse's mouth.

A represents one, and B the other bar of my improved bit.

These two bars are united, at or near their middle, by a pivot-pin, a, which allows them to turn around the said pin, or to nearly cover each other. The longer end of each bar is provided with a suitable ring, b, or other suitable device for securing the rein. On the shorter end of each, or of one of the bars, is a projecting stop, c, as shown.

Figure 1:
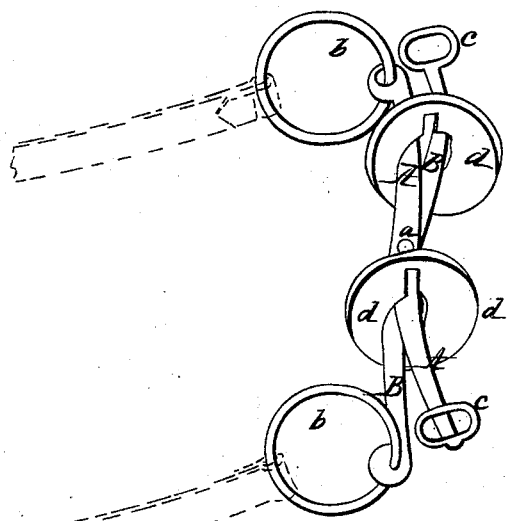
Figure 1 represents a perspective view of my invention, when the same is constituted as a curb-bit.

When the bit is put into a horse's mouth, so that the stop c on one bar is in front of the other bar, then the bars can be turned on their pivots, as shown in fig. 1, so that by pulling the reins the ends of the bars will be drawn back against the horse's cheeks, the bit being thus a complete curb-bit.

Figure 2:
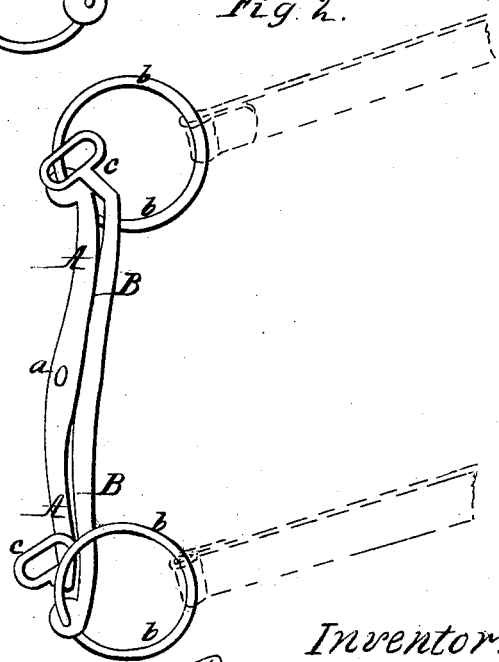
Figure 2 is a similar view of the same, showing it as an ordinary bit.

But when the bit is turned around in the horse's mouth, so that the end of one bar is in front of the stop on the other bar, then the stop prevents the bars from being turned around the pivot a, as long as the ends of the bars are drawn by the reins towards the stop, as indicated in fig. 2. The bit, when thus arranged, may be provided with suitable cheek-rings, d, or other suitable cheek-pieces, which slide on the bars, if the device is constituted as a curb-bit, as shown in fig. 1, and which consequently increase the efficiency of such a curb-bit.

The stops c may be made in form of loops or eyes, to receive the ends of the headstalls, but the latter may as well be secured in the ring b, or its equivalent.

I claim as new, and desire to secure by Letters Patent—

As a new article of manufacture, a curb and driving-bit, consisting of the bars A B, provided with rings b, stops c, and sliding cheek-pieces d, when said bars are each curved in opposite directions from the centre, all constructed, arranged, and operating as set forth.

PATRICK J. McGUINESS.

Witnesses:
WM. F. McNAMARA,
ALEX. F. ROBERTS.